Dec. 18, 1951     A. C. VINE     2,579,220
APPARATUS FOR INDICATING BALLAST CHANGES NECESSARY TO
MAINTAIN SUBMERSED SUBMARINES IN TRIM
Filed May 31, 1949     4 Sheets-Sheet 1

Inventor:
Allyn C. Vine
M. O. Hayes
Attorney

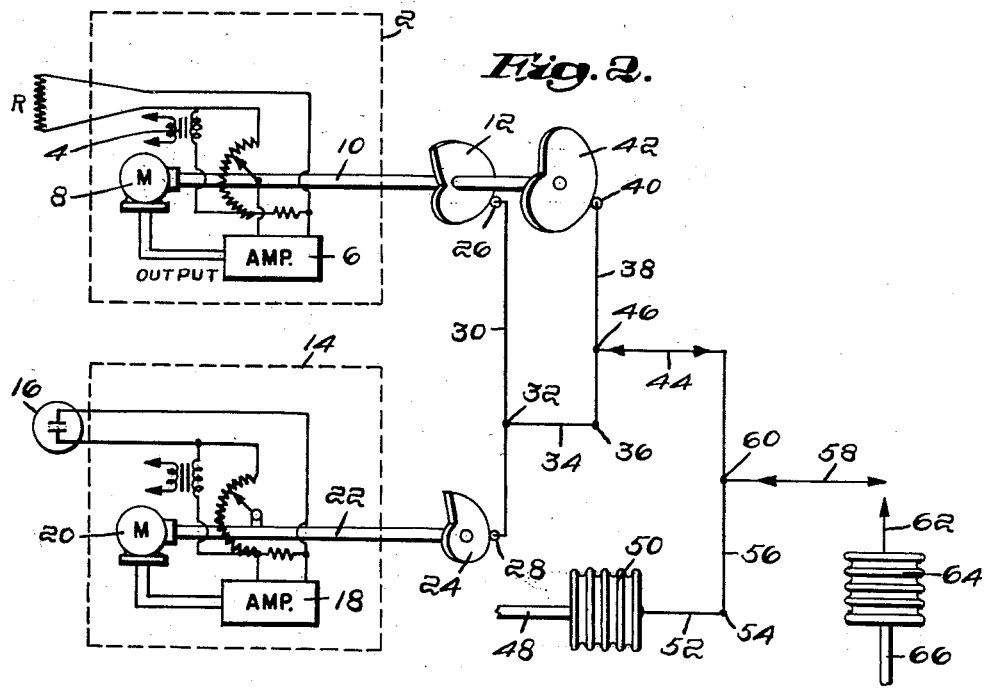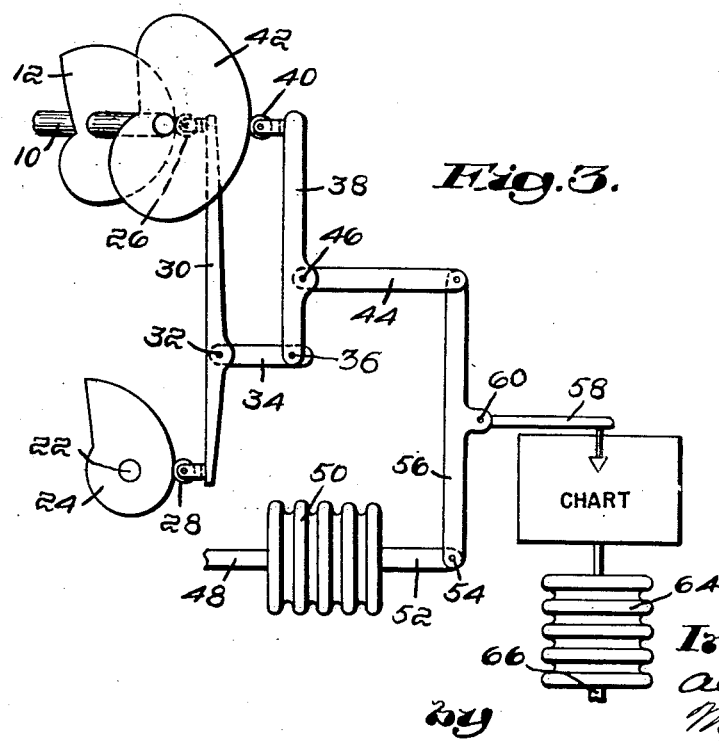

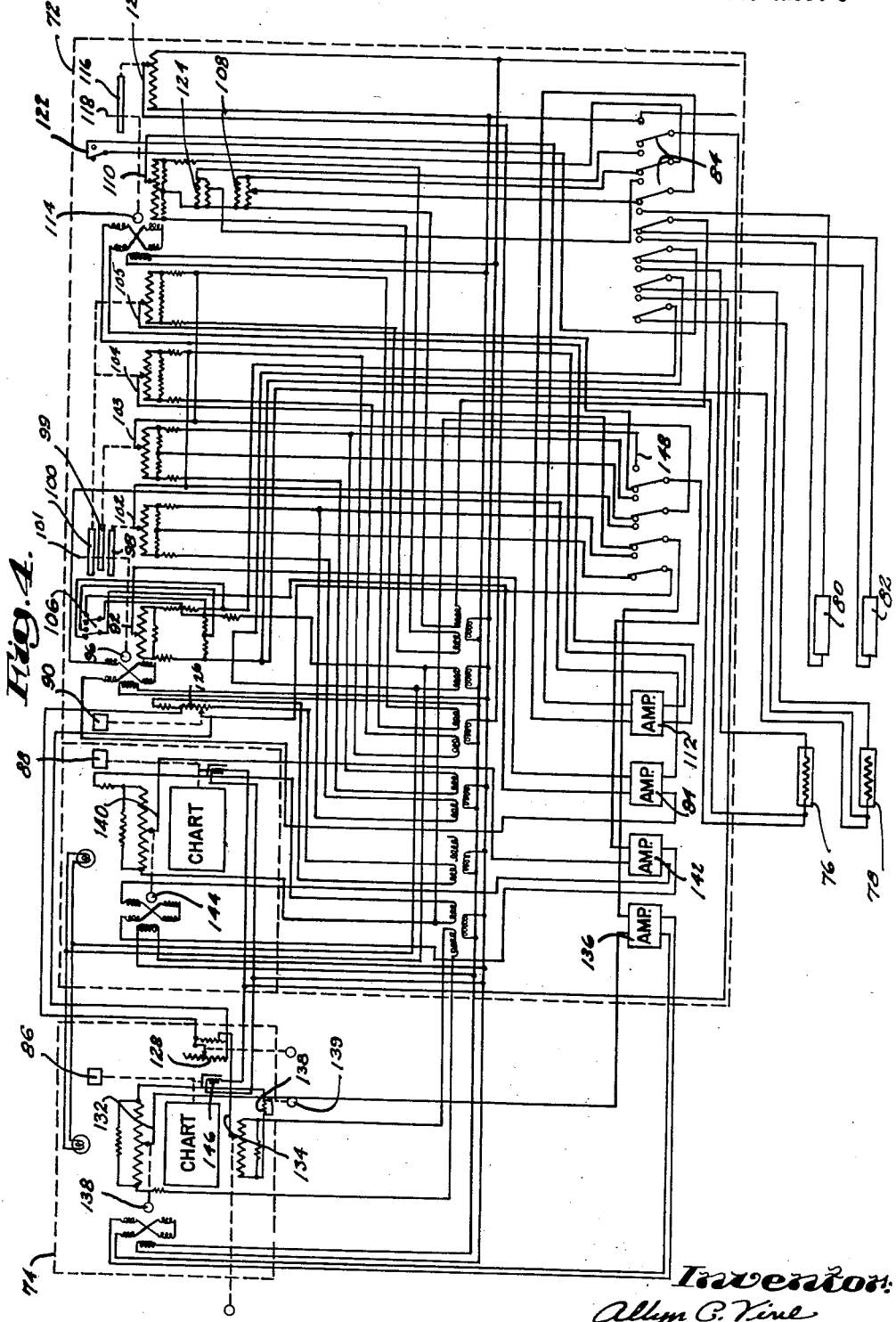

Dec. 18, 1951   A. C. VINE   2,579,220
APPARATUS FOR INDICATING BALLAST CHANGES NECESSARY TO
MAINTAIN SUBMERSED SUBMARINES IN TRIM
Filed May 31, 1949   4 Sheets-Sheet 4

Inventor:
Allyn C. Vine
by M. A. Hayes
Attorney

Patented Dec. 18, 1951

2,579,220

UNITED STATES PATENT OFFICE 2,579,220

APPARATUS FOR INDICATING BALLAST CHANGES NECESSARY TO MAINTAIN SUBMERSED SUBMARINES IN TRIM

Allyn C. Vine, Woods Hole, Mass., assignor to the United States of America as represented by the Secretary of the Navy Application May 31, 1949, Serial No. 96,337

14 Claims. (Cl. 73—178)

This invention relates in general to determining fundamental relationships between sea water variables, and more particularly to the use of mechanical and electrical measuring and computing means, for automatically and continuously solving relationships between sea water temperature, electrical conductivity, pressure and the like, in order to furnish information as to the influence of such properties in connection with offensive and defensive tactics of submarines.

In one specific aspect the invention deals with submarine ballast changing operations and the problems involved in maintaining a submarine in trim when moving from one location to another under water. A vessel is in good trim when it has zero buoyancy, i. e., the weight of the vessel just equals the weight of the water displaced by the hull. Buoyancy control is necessarily dependent upon density of the water in which the submarine is supported as well as the pressure of the water and the compressibility of the hull. The factors for determining the compression of a submarine are the hull compressibility constant and sea water pressure. Density involves determination of other sea water variables such as salinity and temperature and pressure, and salinity itself can be derived from the temperature of sea water and at least one other measured quantity which may conveniently be electrical conductivity of sea water.

In addition to buoyancy determinations, it is desirable to furnish information relating specifically to underwater sound ranging conditions which are determined by sound velocity gradients. As is well known, the velocity of sound in sea water is also dependent upon the sea water variables consisting of temperature, salinity and pressure.

Since sea water variables such as electrical conductivity, temperature, pressure and the like, as measured at one given region in sea water, may vary appreciably over similar determinations taken at different regions, it will be seen that there is a need for continuously observing transient values as a vessel moves from place to place, and moreover there is greater need for solving the necessary relationships sufficiently rapidly to provide a practical indication of the influence of such changes on submarine operation.

The difficulties obviously apparent in rapidly observing these variables and computing relationships from them are in a large measure avoided by the apparatus of the invention, which brings forward a novel computational procedure. Reduced to a practical working basis, the procedure provides a positive, reliable and relatively simple means of interpreting dissimilar values and applying their influence to the operation of submarines. In this connection, I have devised a unique and practical service for measuring simultaneously at least two sea water variables, and then integrating the magnitudes thus obtained to furnish a derived sea water variable which is a function of each of the measured magnitudes. The derived sea water variable constitutes a magnitude which may be converted into a form of energy and the transient nature of the measured magnitudes is taken advantage of, to indicate visually on suitable recording mechanism a continuous energy change.

An important feature of the invention, therefore, is an apparatus for measuring continuously and automatically such variables as pressure, temperature and electrical conductivity of sea water, and simultaneously combining the magnitude thus provided with others to furnish a continuous record of the relative buoyancy of sea water for the regions through which a submarine may pass.

Another feature of the invention is an apparatus for solving fundamental relationships of the character indicated and to furnish a continuous record of the buoyancy of a submarine and to indicate what ballast changes should be made to compensate for changes in buoyancy from time to time.

Another feature of the invention is an apparatus for solving relationships between sea water variables and determining the influence of changes in such variables upon the velocity of sound.

The apparatus of the invention is also adapted for many special purposes such as providing temperature-salinity curves and other types of curves, utilizing fundamental conductivity-temperature-pressure data, or any two of these variables.

Still another novel feature of the invention consists in novel combinations of specific mechanical and electrical means for measuring, computing and recording sea water data to furnish continuously derived values for sea water such as salinity, density, buoyancy, sound velocity and others.

These and other novel features are illustrated in a preferred embodiment of the invention shown in the accompanying drawings, in which Fig. 1 is a functional diagram indicating steps performed by the apparatus of the invention;

Fig. 2 is a diagrammatic view of electrical and mechanical means employed in the invention;

Fig. 3 is another diagrammatic view;

Fig. 4 is a circuit diagram illustrating electrical means of the invention;

Broadly viewed, the invention involves in part a recognition of the fact that there are predictable relationships between those sea water variables which must be derived and other sea water variables which can be directly measured; and in part a linking together of this knowledge with a realization and discovery of the fact that it is possible to solve such relationships automatically. In so doing, it follows that one may integrate continuously the influence of dissimilar variables to provide values which may be relied upon in operating submarines under water.

To this end, I have found by reference to standard oceanographic tables and by an analysis of known data as a function of other known variables in such tables, it is possible to derive certain empirical relationships which can be solved by automatic computational means. It turns out that a range of salinity values can be established, as functions of temperature and electrical conductance, in terms of an equation which includes definite constants as well as measurable values of temperature and electrical conductances added to one another; similarly, density values may be set up in terms of an equation in which functions of salinity and temperature are added to one another; buoyancy values may be set up in terms of an equation in which functions of density and pressure are added to one another; and hull compressibility constant in terms of sound velocity may be provided for by an equation in which functions of salinity and temperature are added to one another.

With a means of solving relationships thus made available, it becomes possible to convert measured values into energy changes and apply the changes to instrumentalities of either a mechanical or electrical nature in accordance with the equations. Thus, in the case of mechanical means, I may employ rotation of a shaft as induced by an energy change to rotate a cam whose surface represents a function of such energy change. Similarly, I may use an electrical system in which potentiometer slide wires are utilized, with the point of contact of the slide wire representing a function of the energy change as delivered in the well-known manner through servomotors.

Figure 1:
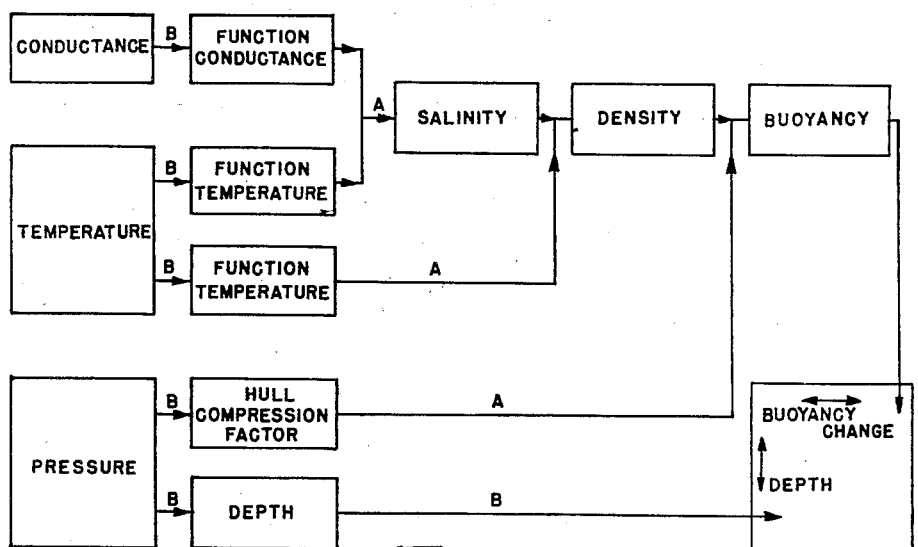
Figure 5:
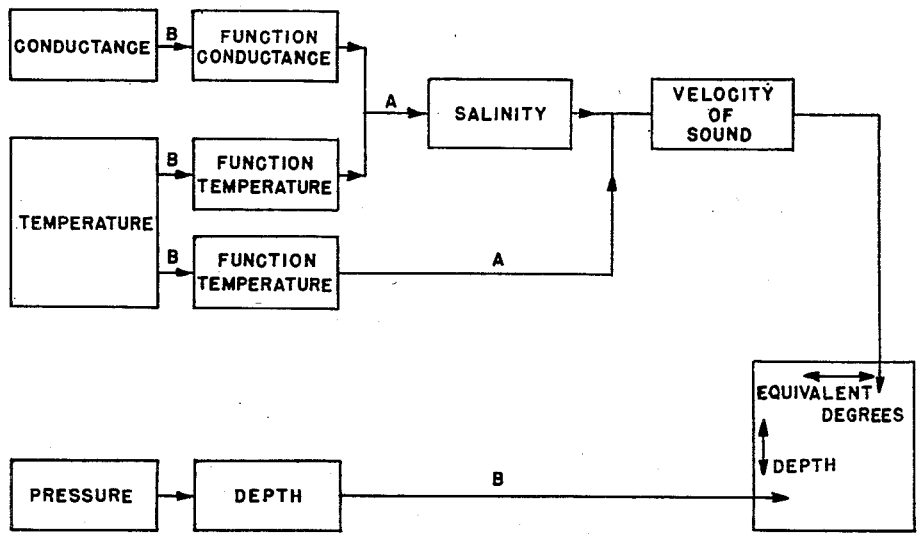
Fig. 5 is another functional diagram.

The influence of integrated values acting through mechanical means will first be described. Attention is directed to Fig. 1 of the drawings in which it will be observed that means for measuring electrical conductance, temperature and pressure are indicated at the extreme left-hand side of the functional diagram, from which values are computed integrated sea water variables including salinity, density and buoyancy as has been suggested by those portions of the block diagram appearing successively at the right-hand side thereof.

In measuring variables such as electrical conductance, temperature and pressure, I may employ various types of well known measuring equipment. For example, I have illustrated at the left-hand side of Fig. 2, two units for making electrical measurements, the unit appearing within the upper dotted line square 2 is intended to be representative of any automatic, commercial type, high-power output temperature measuring element.

In the particular arrangement illustrated, there is provided a resistance thermometer self-balancing bridge having a resistance arm R which is arranged to lie directly in contact with sea water whose temperature is to be measured, and which may for example be located at the outer surface of the conning tower of a submarine. The circuit is supplied with power from a transformer 4 which normally maintains the circuit in balance, for the several resistances shown. In accordance with the principle of a Wheatstone bridge, when the temperature of the water changes a corresponding change occurs in the resistance R, which throws the system out of balance. As a result of this, a voltage is generated and passed to the amplifier 6 which operates a servomotor 8, driving a shaft 10. The shaft is rotated an amount proportional to the voltage which is produced in bringing the Wheatstone bridge system into balance in the well-known manner. The shaft member 10 carries a cam member 12 which is formed with an irregularly curved surface whose curvature is a function of the measured temperature value.

In the lower dotted line square 14, is illustrated an electrical conductivity measuring member illustrative of any commercial automatic self-balancing high-power output conductivity bridge. A cell 16 is exposed to contact with sea water at some convenient point outside the hull of a submarine to unbalance the system. A new voltage is generated to balance the system. This voltage acts through an amplifier 18 and operates a servomotor 20, to rotate a shaft 22 on which is secured a cam 24. The surface of the cam has a curve which is a function of measured electrical conductivity.

The two cams 12 and 24 are operatively connected to cam follower members 26 and 28, respectively, supported by a link member 30 which is in turn pivoted at the point 32, thus allowing the two cam rollers to be displaced in one direction an amount determined by the rotation of the two cams, to produce a total change which is a function of the two measured values. This relationship may be more clearly observed from an inspection of Fig. 3.

The vertical link 30 is connected to a horizontal link 34, pivoted at point 36 to a second vertical link 38. A cam roller 40 at the upper end of link 38 engages the cam surface of cam 42, mounted on the shaft 10 in spaced relation to cam 12. The shaft 10 is rotated an amount which is proportional to a temperature reading, while the shaft 22 is rotated an amount which is proportional to the electrical conductivity reading, and when the integrated result is converted to mechanical movement through the link 34, such motion or displacement is proportional to salinity and offers a reading of such a sea water variable which can be observed and recorded.

When movement of the link 34, representing salinity, combined with movement of cam 42, which also is a function of temperature, there is obtained a displacement of a horizontal link connected to vertical link 38 at point 46. The motion of link 44, being the integrated result of a measured temperature value and a derived salinity value, provides a density reading which likewise can be observed and recorded.

Numeral 48 represents a tubular conduit leading to an exposed point on the hull of a submarine at which sea water pressure is exerted. This pressure is transmitted along the conduit 48 to a bellows element 50, whose horizontal expansion and contraction are utilized to move a link member 52 connected to the bellows, and in turn pivoted at point 54 on the vertical link 56. A third horizontal link 58 is pivoted at point 60 on vertical link 56. Since horizontal movement of link 44 is proportional to density and horizontal movement of link 52 is proportional to sea water pressure, which in turn determines the compressibility of the submarine hull, the integrated result is a buoyancy reading as a function of these two values.

Figure 6:
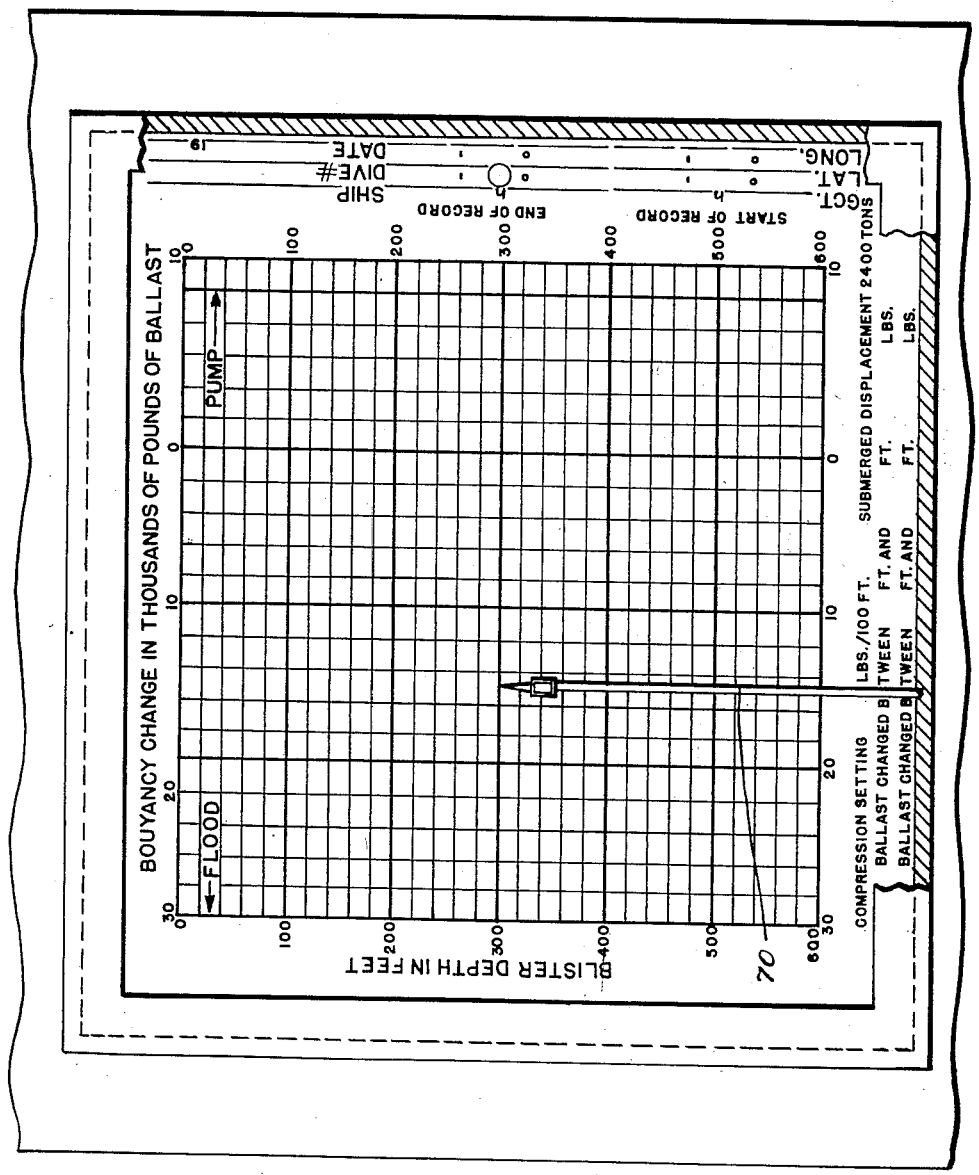
Fig. 6 is an elevational view of a chart and pen assembly.

By combining the motion of link 58, which is a buoyancy value, with vertical movement of a link 62 connected to a bellows 64, which is in turn responsive to sea water pressure changes through connection 66, it is possible to indicate ballast changes. Thus, if link 58 moves a pen in a horizontal direction on a chart, and if link 62 moves the chart vertically as suggested in Fig. 3, a constant ballast change is indicated. In Fig. 6, I have shown the pen 70 and a ballast chart bearing printed subject matter which is self-explanatory with respect to readings which can be made.

It will be apparent that by employing a different type of chart, the same apparatus and movements described may be utilized to provide readings of sound velocity. Thus, the link 44 may represent sound velocity for the conditions noted. Movement of link 48 provides a reading of sound velocity further corrected for depth.

In Fig. 4 of the drawings, I have illustrated electrical means for integrating measured values and converting these derived values into energy changes, thus performing the same general function of the cam and pivoted links just above described. In some respects the electrical means suggested is found to be more satisfactory. The particular circuit illustrated in Fig. 4 may be employed to obtain ballast recording on a chart such as that shown in Fig. 6.

In Fig. 4 the large dotted line rectangle 72 encloses the computing mechanism and the sound velocity recorder. The smaller broken line rectangle 74 at the left-hand side of Fig. 4 encloses the ballast recorder. At the lower side of the figure are resistance thermometer bulbs 76 and 78, and closely adjacent thereto are conductivity cells 80 and 82. Numeral 84 denotes switch means which in the position shown allows the bulb 78 and cell 82 to be used as primary elements. Pressure measuring elements, consisting of Bourdon-type pressure gauges, have been indicated diagrammatically at the points noted by numerals 86, 88 and 90.

A change in temperature of the water surrounding bulb 78 changes its resistance so that the Wheatstone bridge which includes bulb 78 and slide wire 92 becomes unbalanced. This unbalance is represented by an A. C. voltage having a definite phase relationship with respect to the line. This voltage is applied to amplifier 94, the output of which causes servomotor 96 to position the sliding contact on 92 until the bridge balance is restored.

The motor 96 also rotates cams 98, 99 and 100 on shaft 101. Cam 98 positions the sliding contact of potentiometer 102 according to the density as a function of temperature for a salinity of 35 0/00. Cam 99 positions the sliding contact of potentiometer 103, according to the velocity as a function of temperature for a salinity of 35 0/00, and cam 100 positions the sliding contact on potentiometers 104 and 105, according to the temperature function of salinity. Switch 106 provides means of checking the relative positions of the sliding contact of the slide wire 92 and shaft 101.

The conductivity of the water sample in cell 82 determines the magnitude of the alternating current flowing through potentiometer 108, the sliding contact of which is manually positioned only when a new cell is installed, thus taking care of possible differences in cell constants. The voltage drop across potentiometer 108 is balanced by the voltage output of potentiometer 110. When an unbalance is produced by changes in the conductivity of the water sample, this unbalance is applied to amplifier 112, the output of which operates motor 114, to position the sliding contact of potentiometer 110 until a balance is restored. The motor also rotates cam 116 on the shaft 118. Cam 116 positions the sliding contact of potentiometer 120 according to the measured conductivity raised to the 1.09460 power of C, which is the conductivity function of salinity. Switch 122 provides means of checking the relative position of the sliding contact of potentiometer 110 and shaft 118. Potentiometer 124 is manually adjusted for the cell constants for cell 80.

The pressure gauge for pressure element 90 moves the sliding contact of potentiometer 126 linearly with depth so that the output voltage of this potentiometer 126 corresponds to a function of hull compression as it varies with depth. Rheostat 128 in the ballast recorder provides means for adjusting the hull compression factor used for each particular ship.

The output voltage of potentiometer 120 is applied through an isolating transformer to each of potentiometers 104 and 105. Therefore the currents through these potentiometers are proportional to the 1.09460 power of specific conductance. Since the position of the sliding contact of potentiometer 104 corresponds to the temperature function of salinity, the output voltage of potentiometer 104 is then the product of the conductivity and temperature functions or salinity. Similarly, the output of potentiometer 105 corresponds to the salinity. By the proper selection of the circuit constants, the output of potentiometer 104 can represent 0.780 S, and the output of potentiometer 105 can represent 3.90 S, these values being respectively the density and velocity functions of salinity. The subtractions of the constant value of these functions for a salinity of 35 0/00 as indicated in the expressions for the complete density and velocity functions, are made in other parts of the circuit.

The ballast changes are indicated in the following manner: The sum of the output voltages of potentiometers 132 and 134 are balanced against the sum of the output voltages of potentiometers 102, 103 and 126. These latter voltages correspond respectively to density as a function of salinity of 35 0/00 minus the fixed density correction of salinity of 35 0/00, density as a function of salinity, and density as a function of hull compression.

Should either temperature, salinity or depth change, the resulting voltage unbalance is applied to amplifier 136, the output of which causes the servomotor 138 to position the sliding contact of potentiometer 132 until a balance is restored, the motion corresponding to the change in density. The recording pen shown in the chart illustrated in Fig. 6 is connected to the sliding contact of potentiometer 132. When the ship is initially put into trim, the contact of potentiometer 134 is manually adjusted until the recording pen reads zero ballast change. Thereafter the pen position will indicate the required ballast change. Pressure gauge 86 moves the chart proportional to depth at right angles to the motion of the recording pen. When resistor 138 is short-circuited by push button 139, the pen will shift a fixed amount in one direction. This may be done for identification purposes. The circuit may be utilized to provide sound velocity recordings and when used for this purpose, its operation is as follows:

The output voltage of potentiometer 140 is balanced against the sum of output voltages of potentiometers 103 and 105. The voltage corresponds respectively to velocity as a function of temperature at a salinity of 35/00 minus the fixed velocity correction for this salinity, and velocity as a function of salinity. When either temperature or salinity charges, the resulting voltage unbalance is applied to amplifier 142, the output of which causes servomotor 144 to position the sliding contact of potentiometer 140 until a balance is restored. The recording pen is connected to this contact, its position representing the velocity. Pressure gauge 88 moves the chart according to the depth. When switch 84 is thrown to the right, the bulb 78 and cell 82 are disconnected, and the bulb 76 and cell 60 mounted at a higher level on the ship are connected. The switch also energizes solenoids 146 to move the charts in depth an amount corresponding to the difference in height of the two measuring levels. Switch 148 disconnects the salinity correction circuit.

Although, in accordance with the provisions of the patent statutes, I have described this invention as embodied in concrete form and have explained the principle thereof together with the best mode in which I now contemplate applying that principle, it will be understood that the apparatus shown and described is merely illustrative and that the invention is not limited thereto, since alterations and modifications will readily suggest themselves to persons skilled in the art without departing from the true spirit of the invention or from the scope of the annexed claims.

I claim:

1. Apparatus for predicting ballast changes in a submarine comprising thermometer means measuring the temperature of the sea water, conductivity measuring means for determining the electrical conductivity of the sea water, a first pressure-responsive means measuring the pressure of the sea water at the point where other variables are being measured, cam and linkage means combining the measured outputs of said thermometer, said conductivity measuring means and said first pressure-responsive means, a second pressure-responsive means, a chart movable in response to said second pressure-responsive means, and a pointer attached to said linkage means mounted in cooperative relationship with said chart.

2. Apparatus for predicting ballast changes in a submarine comprising, thermometer means, electrical conductivity measuring means and pressure-responsive means for respectively measuring temperature, pressure and the electrical conductivity of sea water in which said submarine is operated, cam and linkage means automatically computing salinity, density and buoyancy from said measured quantities, a chart movable in response to changes in depth of said submarine, and means recording said computed values of salinity, density and buoyancy on said chart in the form of a curve to indicate changes in ballast required to maintain the vessel in trim.

3. Apparatus for predicting ballast changes in a submarine comprising, thermometer means, electrical conductivity measuring means and pressure responsive means for respectively measuring temperatures, pressure, and electrical conductivity of sea water in which said submarine is operated, potentiometer and servomotor means automatically computing salinity, density and buoyancy from said measured quantities, a chart movable in response to changes in depth of said submarine, and means recording said computed values of salinity, density and buoyancy on said chart in the form of a curve to indicate changes in ballast required to maintain the vessel in trim.

4. A computer for predicting ballast changes necessary to maintain a submersed submarine in trim comprising, means for measuring the temperature of the sea water in which the submarine is operated, means for measuring the salinity of said sea water, first integrating means operable by said temperature and salinity measuring means to compute the density of the sea water around said submarine, pressure-responsive means arranged to produce an output indication proportional to the compressibility of the submarine hull at the depth of operation, and second integrating means operable by said first integrating means and said pressure-responsive means to compute the buoyancy of said submarine.

5. A computer for predicting ballast changes necessary to maintain a submersed submarine in trim comprising, means for measuring the temperature of the sea water in which the submarine is operated, means for measuring the electrical conductivity of said sea water, first integrating means operable by said temperature and conductivity measuring means to compute the salinity of said sea water, second integrating means operable by said first integrating means and said temperature measuring means to compute the density of the sea water around said submarine, pressure-responsive means arranged to produce an output indication proportional to the compressibility of the submarine at the depth of measurement, and third integrating means operable by said second integrating means and said pressure-responsive means to compute the buoyancy of said submarine.

6. A computer for indicating ballast changes necessary to maintain a submersed submarine in trim comprising, means for measuring the temperature of the sea water surrounding said submarine, means for measuring the electrical conductivity of said sea water, means for combining the outputs of said temperature and conductivity measuring means for computing salinity as a function of the temperature of said sea water, means for combining said function of salinity with the output of said temperature measuring means for computing the density of said sea water, first pressure-responsive means for producing an output representative of the compressibility of the submarine hull at the depth of operation, means for combining the output of said first pressure-responsive means and the output of said density computing means to produce mechanical movement of an element representative of the buoyancy of said submarine, a second pressure-responsive means, and a chart movable in response to said second pressure-responsive means and cooperatively arranged with said element to indicate changes in ballast required to maintain said submarine in trim.

7. A computer for predicting ballast changes necessary to maintain a submersed submarine in trim comprising, means for producing rotation of a first shaft in response to changes in temperature of the sea water surrounding said submarine, first and second cams having curvatures representative of first and second junctions of temperature mounted on said first shaft for rotation therewith, means for producing rotation of a second shaft in response to changes in electrical conductivity of the sea water surrounding said submarine, a third cam having a curvature representative of a function of conductivity secured to said second shaft for rotation therewith, means responsive to changes in depth of said submarine for producing movement of an element in accordance with the compressibility of the hull of said submarine, a chart and a pointer cooperatively arranged therewith, means connected to said pointer and operative in response to the rotation of said first, second and third cams and the movement of said element for combining said functions of temperature, conductivity and hull compressibility to produce movement of said pointer representative of the buoyancy of said submarine, and second pressure-responsive means coupled to said chart for causing movement thereof in response to changes in depth of said submarine, said pointer and chart being arranged to indicate changes in ballast required to maintain the submarine in trim.

8. A computer for predicting ballast changes necessary to maintain a submerged submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, means operative in response to movement of said first, second and third cams and said element for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

9. A computer for predicting ballast changes necessary to maintain a submersed submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, a mechanical linkage mechanism controlled by said first, second and third cams and said element for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

10. A computer for predicting ballast changes necessary to maintain a submersed submarine in trim comprising, means for measuring the temperature of the seat water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure responsive means arranged to produce mechanical movement of an element representative of the hull compressibility of said submarine, and a pivoted linkage mechanism controlled jointly by the curvature of said first, second and third cams and said element for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

11. A computer for predicting ballast changes necessary to maintain a submersed submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, cam followers contacting each of said cams, and a pivoted linkage mechanism operatively connected to said cam followers and said element for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

12. A computer for predicting ballast changes necessary to maintain a submersed submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, a plurality of energized potentiometers having movable arms, means for controlling the movement of said arms in accordance with the curvature of said cams and the movement of said element, means combining the outputs of said potentiometers for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

13. A computer for predicting ballast changes necessary to maintain a submersed submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, means controlled by said cams for producing voltages proportional to the curvature of said cams, means for producing a voltage proportional to the movement of said element, means combining said voltages for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

14. A computer for predicting ballast changes necessary to maintain a submersed submarine in trim comprising, means for measuring the temperature of the sea water surrounding said submarine including apparatus for producing rotation of a first shaft in accordance with changes in temperature, first and second cams having curvatures representative of first and second functions of temperature mounted on said first shaft for rotation therewith, means for measuring the electrical conductivity of the water surrounding said submarine including apparatus for producing rotation of a second shaft in accordance with changes in conductivity, a third cam having a curvature representative of a function of conductivity mounted on said second shaft for rotation therewith, first pressure-responsive means arranged to produce mechanical movement of an element representative of the hull compressibility of said submarine, first, second and third potentiometers respectively controlled by said first, second and third cams for producing first, second and third voltages proportional to the curvature of its associated cam, means for producing a fourth voltage proportional to the movement of said element, a transformer having a plurality of windings combining said first, second, third and fourth voltages for combining said functions of temperature, conductivity and hull compressibility to produce movement of a pointer representative of the buoyancy of said submarine, second pressure-responsive means, and a chart connected to said second pressure-responsive means and movable in response to changes in depth of said submarine, said pointer and said chart being coactively arranged to indicate changes in ballast required to maintain the vessel in trim.

ALLYN C. VINE.

REFERENCES CITED

The following references are of record in the file of this patent:

UNITED STATES PATENTS

| Number | Name | Date |
| --- | --- | --- |
| 1,543,137 | Weaton | June 23, 1925 |
| 1,601,383 | Todd | Sept. 28, 1926 |
| 1,986,986 | Swartwout | Jan. 8, 1935 |
| 2,052,764 | Harrison | Sept. 1, 1936 |
| 2,179,822 | Imm | Nov. 14, 1939 |
| 2,319,322 | Hefel | May 18, 1943 |
| 2,331,810 | Spilhaus | Oct. 12, 1943 |